(12) United States Patent
Repin (10) Patent No.: US 8,503,277 B1
(45) Date of Patent: Aug. 6, 2013

(54) PHOTO/LIGHT BASED DATA STORAGE, DISTRIBUTION AND SIMULTANEOUS DATA ACCESS FOR MULTI-PROCESSOR SYSTEM

(76) Inventor: Vladimir Repin, Woodstock, GA (US)

( * ) Notice: Subject to any disclaimer, the term of this patent is extended or adjusted under 35 U.S.C. 154(b) by 0 days.

(21) Appl. No.: 12/932,663

(22) Filed: Mar. 2, 2011

(51) Int. Cl.
*G11B 7/00* (2006.01)
*G11B 31/00* (2006.01)

(52) U.S. Cl.
USPC ........ 369/53.27; 369/53.2; 369/47.2; 369/69; 369/53.22

(58) Field of Classification Search
USPC ............. 369/53.2, 103, 47.2, 47.23, 47.24, 369/124.03, 100, 53.22, 53.27, 47.27, 69, 369/70, 90–96, 102, 124.02
See application file for complete search history.

(56) References Cited

U.S. PATENT DOCUMENTS

| | | | | |
|---|---|---|---|---|
| 2,203,353 | A * | 6/1940 | Goldmark | 369/60.01 |
| 4,320,486 | A * | 3/1982 | Cooley et al. | 369/14 |
| 6,181,662 | B1 * | 1/2001 | Krieger et al. | 369/70 |
| 7,221,632 | B2 * | 5/2007 | Worthington | 369/53.2 |
| 7,408,634 | B2 * | 8/2008 | Gardner et al. | 356/243.1 |
| 2004/0037202 | A1 * | 2/2004 | Brommer et al. | 369/94 |
| 2006/0280096 | A1 * | 12/2006 | Riley et al. | 369/103 |
| 2008/0144459 | A1 * | 6/2008 | Selinfreund et al. | 369/53.2 |
| 2009/0052297 | A1 * | 2/2009 | Ku et al. | 369/100 |
| 2009/0103416 | A1 * | 4/2009 | Smith et al. | 369/103 |

* cited by examiner

*Primary Examiner* — Wayne Young
*Assistant Examiner* — Dionne Pendleton (57) ABSTRACT

This invention relates generally to a photon/light based data storage, distribution and simultaneous data access system for a multiprocessor computer system.

17 Claims, 11 Drawing Sheets

Laser beam
to flip-flop sutter

Flip-Flop Shutter — 160

Phosphor

UV Laser beam
to charge Phosphor

PHOTO/LIGHT BASED DATA STORAGE, DISTRIBUTION AND SIMULTANEOUS DATA ACCESS FOR MULTI-PROCESSOR SYSTEM

COPYRIGHT NOTICE

A portion of the disclosure of this patent document contains material which is or may be subject to copyright protection. The copyright owner has no objection to the facsimile reproduction by anyone of the patent document or the patent disclosure, as it appears in the Patent and Trademark Office patent file or records, but otherwise reserves all copyright whatsoever in all forms currently known or otherwise developed.

BACKGROUND OF THE INVENTION

The present invention relates generally to a photon/light based data storage, distribution and simultaneous data access system for a multiprocessor computer system.

An initial response to a need for greater data processing capability is to operate the central processing unit at higher speeds. Increasing the rate of operation of a central processing unit enables greater data processing operations per unit time. This is not a complete solution because memory speed often cannot keep pace with processor speed. The mismatch of processor speed and memory speed can be minimized using memory cache, but such memory cache introduces other problems. Often high processor speeds require deep pipelining. Deep pipelining extends the processing time required to process conditional branches. Thus increased processor speed can achieve only limited improvement.

Another potential response is multi-processing. The central processing unit and at least some auxiliary circuits are duplicated. Additional data processor cores enable greater data processing operations per unit time.

Multi-processor computer systems which provide increased processing power through parallel processing operation are known. Such systems are used in a wide variety of applications wherein functions are allocated to different processors. Systems present many scalability problems since the bus may be saturated by a relatively small number of processors. One means of increasing the total number of available interconnected processors is to employ multiple sub-systems, together with some means of communicating between sub-systems, typically some form of reflective memory. Such a system can be designed in such a way that the majority of inter-processor communication remains within a sub-system, and has no impact on other sub-systems, whilst the reflective memory system provides communication between sub-systems when required. This approach however is relatively expensive in terms of the additional packaging hardware, support hardware and the reflective memory system required.

When a particular application/project/job requires more processing power than a single processor is capable of providing, it becomes necessary to provide a co-processor, such as a digital signal processor (DSP) or a floating point unit (FPU). Thus, the tasks associated with the particular application are handled in unison by the main processor and the co-processor. The most common conventional solution to solving the problem of how to allocate the resources to the multiple processors is to utilize a dual-ported memory sub-system wherein each processor has equal access to the common resources that may be used by both processors. Alternatively, each processor may be provided with a dedicated resource and a mechanism for transferring commands and data through a shared "Mail Box." The shared "Mail Box" typically includes a number of first in/first out (FIFO) registers of varying length.

The conventional dual-ported memory solution provides processor independent design implementation, but requires a large amount of hardware for the random access arbitration for both processors. Consequently, the actual implementation of the arbitration logic and the random access for the common bus creates more delay on the common resources since the access to the common bus must be determined prior to accessing the common resources. The typically small degradation in the access speed in the dual-ported memory is magnified by a significant amount when that common resource is the main memory because the main memory is the common resource most utilized by both processors. Therefore, the interdependency of the multiple processors increases since they both rely heavily on the main memory.

The conventional dedicated resource for each processor with the shared "Mail Box" scheme prevents the multiple processors from competing with each other for the same resource, but suffers greatly in terms of access speed both since the data and commands must all pass through the "Mail Box" which has a relatively narrow bandwidth. In addition, duplicative resources are necessary since each processor has requires its own dedicated and duplicated resources. Although the scheme works quite well when the tasks for the processors are well defined and common mailbox data transfer size is relatively small, the actual performance and resource utilization suffers greatly when the tasks are not well defined and the processors are therefore more interdependent. Thus, there is a need in the art for a system and method which permits multiple processors to communicate with each other and control the access to the shared resources, and, ideally, to permit substantially simultaneous access by each of the processors to the data.

Although multiprocessors enhance the performance of a computer system, the multiple processors also create additional problems, such as when more than one of the processors attempts to access a shared hardware or software resource at the same time. A conventional solution to this problem has been through the use of semaphores located in memory. In general, semaphores are counters that are used to control access to shared resources by multiple processes. Semaphores are commonly used as a locking mechanism to prevent processes from accessing a particular resource while another process is performing operations on it.

In operation, for example, if a processor wants to access a system resource it must first check the status of the desired resource by sending a read command over the system bus to the associated semaphore in the system memory, and the semaphore returns the status information back to the processor. If the desired resource is available, the processor sends a write command to the semaphore to change the status of the semaphore from "available" to "unavailable." To prevent another process or processor from checking the status of the semaphore concurrent with the processor, prior to sending the read command, the processor will traditionally lock the system bus until the read/write routine is completed.

Not only does locking the system bus prevent another processor or "master" from accessing the particular semaphore, but it also prevents the other processors from communicating with the other devices on the bus. This is disadvantageous in that it slows the efficiency of the system, resulting in an increased latency of system operations which defeats the advantages of utilizing a multiple processor architecture.

Accordingly, there is a need in the art for a system and method that permits multiple processors to communicate with each other and to control access to shared resources without "locking" the system bus, thus maintaining the increased efficiency and additional advantages offered by a multiprocessor system. There is also a need in the art for a system and method which permits simultaneous access to the shared data by each of the multiple processors and elimination of the use of electrical currents to transmit the data, thus increasing the overall speed of the operation of the system.

Moving from a uni-processor system to a multi-processor system involves numerous problems on both the hardware and software side. In theory providing additional data processor cores permits additional data processing operations. However, proper programming of a multi-processor system to advantageously exploit additional data processor cores is difficult. One technique attempting to solve this problem is called symmetrical multi-processing (SMP). In symmetrical multi-processing each of the plural data processor cores is identical and operates on the same operating system and application programs. It is up to the operating system programmer to divide the data processing operations among the plural data processor cores for advantageous operation. This is not the only possible difficulty with SMP. Data processor cores in SMP may operate on data at the same memory addresses such as operating system file structures and application program data structures.

Any write to memory by one data processor core may alter the data used by another data processor core. The typical response to this problem is to allow only one data processor core to access a portion of memory at one time using a technique such as spin locks and repeated polling by a data processor not currently granted access. This is liable to cause the second data processor core to stall waiting for the first data processor core to complete its access to memory. The problems with sharing memory are compounded when the identical data processor cores include caches. With caches each data processor core must snoop a memory write by any other data processor core to assure cache coherence. This process requires a lot of hardware and takes time. Adding additional data processor cores requires such additional resources that eventually no additional data processing capability is achieved by such addition.

Each multi-processing model which is currently employed has one or more problems associated with it which limit either its speed or access to data. For example, another multi-processing model is called the factory model. The factory model multi-processing requires the software developer to manually divide the data processing operation into plural sequential tasks. Data processing then flows from data processor core to data processor core in the task sequence. This division of the task is static and not altered during operation of the multi-processor system. This is called the factory model in analogy to a factory assembly line. This factory model tends to avoid the data collisions of the SMP model because the data processor cores are working on different aspects of the data processing operation. This model tends to work best for data flow operations such as audio or video data streaming.

This factory model is often used in digital signal processing (DSP) operations which typically have many of these data flow operations. There are problems with this factory model as well. The task of dividing the data processing operation into sequential tasks is generally not simple. For even loading of the data processor cores is required to best utilize this factory model. Any uneven loading is reflected in one or more data processor cores being unproductive while waiting for data from a prior data processor core or waiting for a next data processor core to take its data output. The nature of the data processing operation may preclude even loading of the plural data processor cores. Processes programmed using the factory model do not scale well. Even small changes in the underlying data processing operation to be performed by the system may require complete re-engineering of the task division.

Thus, it is evident that those computer systems which use electricity driven data buses to exchange data between processors limit both the access time and the response time, thereby slowing down the entire processing endeavor. These problems are inherent in the use of a data bus and are common for all computer components which rely on access to the same data source. Simply put, if a data bus is serving a particular computer component, such as a processor which is sending data to a hard drive, all other devices must wait until this operation is completed in order to get access to that data bus and thereby gain access to the underlying data.

The distributive problem is often dealt with at the processor level by the use of a combination of hardware and software implementations which attempt to maximize speed and access. There have also been attempt to deal with the issues at the memory cell level.

Integrated circuit designers have always sought the ideal semiconductor memory: a device that is randomly accessible; can be written to or read from very quickly; is non-volatile, but indefinitely alterable; and consumes little power.

One common volatile memory is the DRAM in which information can be written to and read from as bits of data, e.g., a "1" or a "0," where a "1" generally corresponds to one voltage state stored on a capacitor, and a "0" generally corresponds to another voltage state stored in the capacitor. The capacitor of the DRAM cell typically has an associated transistor that acts as a switch to allow the control circuitry on the memory chip to read from and write to the capacitor.

DRAM cells suffer from a number of shortcomings. First, the capacitor of a DRAM cell is extremely energy inefficient because capacitors of DRAM cells quickly lose their stored voltage, and need to be refreshed to prevent the cell from being discharged, resulting in high levels of energy consumption. Second, because DRAM cells are based on electrical signals, the speed of integrated chips are not only limited by the speed by which electrons travel through matter, but are also limited by the number of interconnections within the chip necessary to effect proper transfer and storage of the signals; these additional interconnections contribute to the problem of short circuits. Finally, the electrical signals used in conventional memory cells can interfere with each other, resulting in increased cross-talk, and decreased performance, which is undesirable.

A typical DRAM consists of an array of transistors or switches coupled to capacitors, where the transistors are used to switch a capacitor into or out of a circuit for reading or writing a value stored in the capacitive element. These storage bits are typically arranged in an array of rows and columns, and are accessed by specifying a memory address that contains or is decoded to find the row and column of the memory bit to be accessed.

DRAM devices such as DDR (Double Data Rate) memory incur a timing penalty when a write request follows a read request. Because the data bus is shared between the read and write references, the memory manager must delay sending the write request to memory until the read data from the previous read request is done with the data bus. In some forms of DDR memory, this delay time is on the order of 6 ns. Typical computer systems ignore this timing penalty and, therefore, face a performance penalty on accesses to memory.

Important characteristics for a memory cell in electronic device are low cost, nonvolatility, high density, low power, and high speed. Conventional memory solutions include Read Only Memory (ROM), Programmable Read only Memory (PROM), Electrically Programmable Memory (EPROM), Electrically Erasable Programmable Read Only Memory (EEPROM), Dynamic Random Access Memory (DRAM) and Static Random Access Memory (SRAM).

ROM is relatively low cost but cannot be rewritten. PROM can be electrically programmed but with only a single write cycle. EPROM has read cycles that are fast relative to ROM and PROM read cycles, but has relatively long erase times and reliability only over a few iterative read/write cycles. EEPROM (or "Flash") is inexpensive, and has low power consumption but has long write cycles (ms) and low relative speed in comparison to DRAM or SRAM. Flash also has a finite number of read/write cycles leading to low long-term reliability. ROM, PROM, EPROM and EEPROM are all non-volatile, meaning that if power to the memory is interrupted the memory will retain the information stored in the memory cells.

DRAM stores charge on transistor gates that act as capacitors but must be electrically refreshed every few milliseconds complicating system design by requiring separate circuitry to "refresh" the memory contents before the capacitors discharge. SRAM does not need to be refreshed and is fast relative to DRAM, but has lower density and is more expensive relative to DRAM. Both SRAM and DRAM are volatile, meaning that if power to the memory is interrupted the memory will lose the information stored in the memory cells.

Consequently, existing technologies are either non-volatile but are not randomly accessible and have low density, high cost, and limited ability to allow multiples writes with high reliability of the circuit's function, or they are volatile and complicate system design or have low density. Some emerging technologies have attempted to address these shortcomings.

For example, magnetic RAM (MRAM) or ferromagnetic RAM (FRAM) utilizes the orientation of magnetization or a ferromagnetic region to generate a nonvolatile memory cell. MRAM utilizes a magnetoresistive memory element involving the anisotropic magnetoresistance or giant magnetoresistance of ferromagnetic materials yielding nonvolatility. Both of these types of memory cells have relatively high resistance and low-density. A different memory cell based upon magnetic tunnel junctions has also been examined but has not led to large-scale commercialized MRAM devices. FRAM uses a circuit architecture similar to DRAM but which uses a thin film ferroelectric capacitor. This capacitor is purported to retain its electrical polarization after an externally applied electric field is removed yielding a nonvolatile memory. FRAM suffers from a large memory cell size, and it is difficult to manufacture as a large-scale integrated component. More details are discussed in U.S. Pat. Nos. 4,853,893; 4,888,630; and 5,198,994, the contents of which are incorporated by reference.

Another technology having non-volatile memory is phase change memory. This technology stores information via a structural phase change in thin-film alloys incorporating elements such as selenium or tellurium. These alloys are purported to remain stable in both crystalline and amorphous states allowing the formation of a bistable switch. While the nonvolatility condition is met, this technology appears to suffer from slow operations, difficulty of manufacture and reliability and has not reached a state of commercialization. More details are discussed in U.S. Pat. Nos. 3,448,302; 4,845,533; 4,876,667; 6,044,008, the contents of which are incorporated by reference.

Wire crossbar memory (MWCM) has also been disclosed in U.S. Pat. Nos. 6,128,214; 6,159,620; and 6,198,655, the contents of which are incorporated by reference. These memory proposals envision molecules as bistable switches. Two wires (either a metal or semiconducting type) have a layer of molecules or molecule compounds sandwiched in between. Chemical assembly and electrochemical oxidation or reduction are used to generate an "on" or "off" state. This form of memory requires highly specialized wire junctions and may not retain nonvolatility owing to the inherent instability found in redox processes. Memory devices have been proposed which use nanoscopic wires, such as single-walled carbon nanotubes, to form crossbar junctions to serve as memory cells. Typically, individual single-walled nanotube wires suspended over other wires define memory cells. Electrical signals are written to one or both wires to cause them to physically attract or repel relative to one another. Each physical state (i.e., attracted or repelled wires) corresponds to an electrical state. Repelled wires are an open circuit junction. Attracted wires are a closed state forming a rectified junction. When electrical power is removed from the junction, the wires retain their physical (and thus electrical) state thereby forming a non-volatile memory cell.

In a parallel trend, as discussed in United States Patent Application 20030121764, nanowires are often thin strands of conductive or semiconductive materials with diameters in the nanometer range to a few hundred nanometers. The nanowires have been operated in a room-temperature, ultraviolet lasing mode. These devices can convert electrical energy into light energy. United States Patent Application 20050009224 mentions the high cost of manufacturing conventional solar cells limits their widespread use as a source of power generation. The construction of conventional silicon solar cells involves four main processes: the growth of the semiconductor material, separation into wafers, formation of a device and its junctions, and encapsulation. For cell fabrication alone, numerous steps are required to make the solar cell and many of these steps require high temperatures (300.degree. C.-1000.degree. C.), high vacuum or both. In addition, the growth of the semiconductor from a melt is at temperatures above 1400.degree. C. under an inert argon atmosphere. To obtain high efficiency devices (>10%), structures involving concentrator systems to focus sunlight onto the device, multiple semiconductors and quantum wells to absorb more light, or higher performance semiconductors such as GaAs and InP, are needed. These options all result in increased costs.

In summary, typical memory devices are composed of an array of bit cells, with each bit cell having a storage component to store or retain an electrical charge representative of a bit value (e.g., a logic "0" or a logic "1"). However, due to the electrical properties of the bit cells, memory devices typically can operate with relatively low power consumption or at relatively high speed, but not both. Further, memory architectures that operate with relatively low power consumption or operate at relatively high speeds typically are difficult to scale. Flash memories, for example, exhibit relatively low power consumption and are relatively easy to scale but are relatively slow in comparison to other memory architectures, such as static random access memories (SRAMs), which are relatively fast but often are difficult to scale and typically do not operate reliably in low power implementations. Accordingly, an improved technique for storing, retaining and permitting simultaneous access to data by multiple processors would be advantageous.

BRIEF SUMMARY OF THE INVENTION

The various proposed aspects of the exemplary embodiments of the invention provide a data distribution device which is driven by light and does not have many of the limitations associated with electric based buses. In particular a photon/light based memory employs a layer comprised of phosphorescent materials which are capable of receiving and emitting light. The data may be stored by the phosphorescent materials in the form of radiation. The absence of radiation would indicate a "0" bit and the presence of radiation would indicate a "1" bit. This could also be reversed such that the absence of radiation would indicate a "1" bit and the presence of radiation would indicate a "0" bit. Because of the absence of traditional electrically based buses and interconnections, multiple photo-detectors may be employed to access the data simultaneously without the necessity of a bus, lockout or similar hardware or software limiting devices or implementations.

In a further aspect of the invention, using photon/light permits the formation of a data storage device which includes an array of phosphorescent material elements and a light encoder coupled to the array to select one or more of the memory elements to be radiated. In a further embodiment, one or more of the phosphorescent material elements is activated by one or more light encoder thus providing a "1" bit and one or more phosphorescent material elements is not activated, thus providing a "0" bit.

In a further aspect of the system, a photon/light decoder is coupled to the array to detect the state of one or more of the memory elements. In yet another aspect of the system multiple photon/light decoders are provided to sense the state of the phosphorescent material elements which had either been activated or not activated. It is a further aspect and advantage of the system that by the use of photo-detectors multiple processors may obtain access to the data at the same time.

In yet a further embodiment, an array of multiple phosphorescent elements is activated and/or sensed by a multidimensional read/write head employing multiple photon/light elements which may be advantageously employed as either photo-activators or photo-detectors. In another embodiment each memory cell employs at least a single molecule memory of phosphorescent material. Memory cells may be advantageously arranged in rows and columns to form a memory array. Photon/light circuitry allows individual addressing capabilities for each of the electronic memory cells to permit either the activation of a memory cell or the reading of the data on such as cell. The memory cells may be addressed either serially or in parallel by using appropriate read write access techniques and the data may be obtained substantially simultaneously on multiple processors.

In yet another aspect of the invention, because light has electromagnetic wave characteristics and it does not require any special media like wires in order to either read or write to a specific memory cell, it is possible to use using several photo-detectors in order to read the same spot of glowing fluorescence material without the photo-detectors interfering with one another. Similarly, where the phosphorescent material is of a size sufficient to permit it to be accessed by multiple photo-activator beams, it is also possible to write information at the same time to different spots of the same fluorescence material using many photon/light beams.

In yet another aspect of the data storage system, a phosphorescent material may be deployed within a disk structure such that it is accessible from either side of that structure. In such a disk structure the phosphorescent material may be activated on either side and the phosphorescent state of the material may be detected from either side. Alternatively the phosphorescent material may be employed within a structure where in only one side is accessible and the activation and phosphorescent state of the material will only be detected on that side.

In yet another aspect, the phosphorescent material which may be used may have a capacity to either be activated or deactivated by a photon/light array. Thus, the photon/light array may be used to cause the phosphorescent material to be a flip-flop circuit thereby encoding either a "1" bit or a "0" bit depending on the data to be encoded.

Advantages of the data storage devices and the related distribution system may include one or more of the following aspects: low power consumption, non-volatility, high density and high speed.

DETAILED DESCRIPTION OF THE INVENTION

Certain terminology may be used in the following description for convenience only and is not limiting. The words "lower" and "upper" and "top" and "bottom" designate directions only and are used in conjunction with such drawings as may be included to fully describe the invention. The terminology includes the above words specifically mentioned, derivatives thereof and words of similar import.

Where a term is provided in the singular, the inventors also contemplate aspects of the invention described by the plural of that term. As used in this specification and in any claims, the singular forms "a", "an", and "the" include plural references unless the context clearly dictates otherwise, e.g. "a derivative work". Thus, for example, a reference to "a method" includes one or more methods, and/or steps of the type described therein and/or which will become apparent to those persons skilled in the art upon reading this disclosure.

Unless defined otherwise, all technical, legal, copyright related and scientific terms used herein have the same meaning or meanings as commonly understood by one of ordinary skill in the art to which this invention belongs. Although any methods and materials similar or equivalent to those described herein can be used in the practice or testing of the present invention, the preferred methods, constructs and materials are described herein. All publications mentioned herein, whether in the text or by way of numerical designation, are incorporated herein by reference in their entirety. Where there are discrepancies in terms and definitions used by reference, the terms used in this application shall have the definitions given herein.

The term "variation" of an invention includes any embodiment of the invention, unless expressly specified otherwise.

A reference to "another embodiment" in describing an embodiment does not necessarily imply that the referenced embodiment is mutually exclusive with another embodiment (e.g., an embodiment described before the referenced embodiment), unless expressly specified otherwise.

The terms "include", "includes", "including", "comprising" and variations thereof mean "including but not limited to", unless expressly specified otherwise.

The term "consisting of" and variations thereof includes "including and limited to", unless expressly specified otherwise.

The terms "a", "an" and "the" mean "one or more", unless expressly specified otherwise. The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The terms "such as", and/or "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 7 may be provided by a single shared processor or multiple processors. Use of the term "processor" should not be construed to refer exclusively to hardware capable of executing software. Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

A "processor" includes one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" includes any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

This detailed description make reference to certain exemplary embodiments of the invention and various aspect of the invention. Other embodiments may be employed, and aspects described or not described, and structural and electrical changes may be made without departing from the spirit or scope of the present invention.

The term "substrate" is used in broadest sense and may include both a topical carrier for a material as well as an inclusion carrier where the material is placed within the substrate. Thus, it may include any semiconductor-based structure that has an exposed semiconductor surface as well as a structure which has one or more holes therein which may advantageously used as repositories for the phosphorescent material. The semiconductor structure should be understood to include silicon, silicon-on-insulator (SOI), silicon-on-sapphire (SOS), doped and undoped semiconductors, epitaxial layers of silicon supported by a base semiconductor foundation, and other semiconductor structures.

Figure 1:
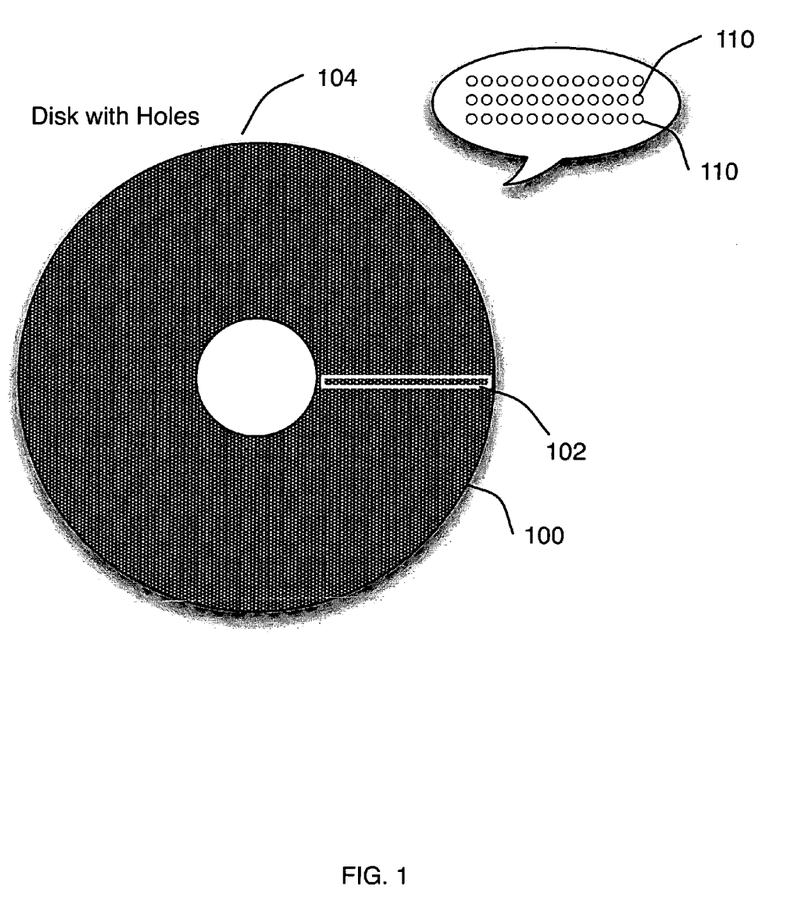
FIG. 1 is a simplified top view of a memory array illustratively depicting one embodiment of an aspect of the invention.

The semiconductor substrate need not be silicon-based. The semiconductor could be silicon-germanium, germanium, or gallium arsenide. When reference is made to a semiconductor substrate in the following description, previous process steps may have been utilized to form regions or junctions in or over the base semiconductor or foundation. Also, the invention may be formed over non-semiconductor substrates and it is understood that the term substrate subsumes both semiconductor and non-semiconductor material which may be employed to effectuate the purposes and teachings of the invention and the various embodiments thereof, FIG. 1 illustrates a storage array disk 100 according to certain embodiments of the invention. The illustrated storage array disk 100 includes a series of rows 102 and columns 104. Each row 102 and column 104 is formed by a plurality of the memory elements 106. Each of the memory elements 106 is comprised of a phosphorescent material layer 108 which is capable of being activated by radiation and emitting radiation as a result of the activation.

Figure 1A:
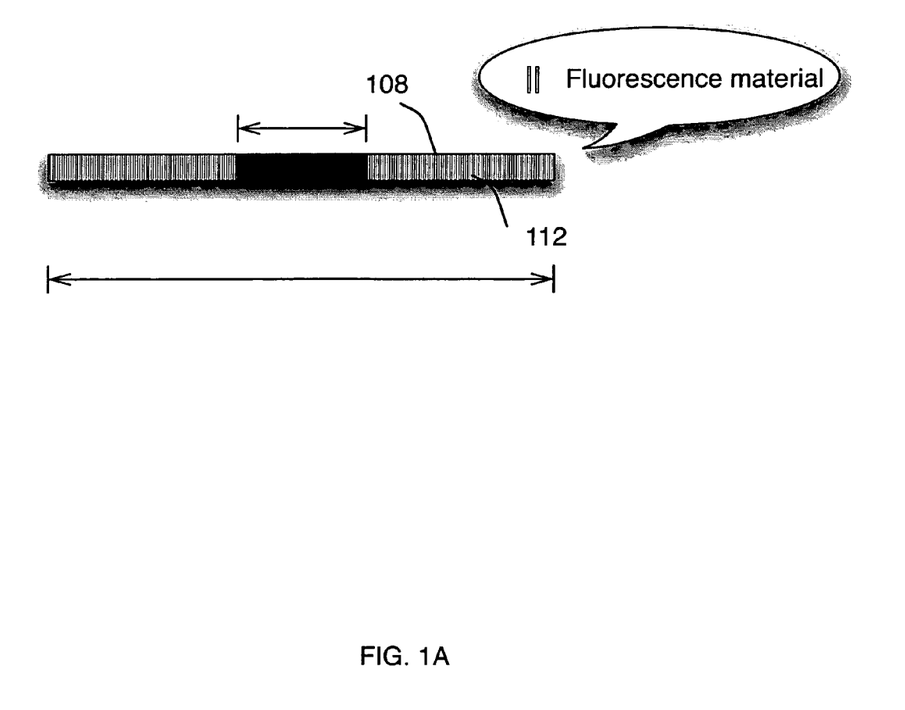
FIG. 1A is a cross-sectional view of a memory array illustratively depicting one embodiment of an aspect of the invention.
Figure 1B:
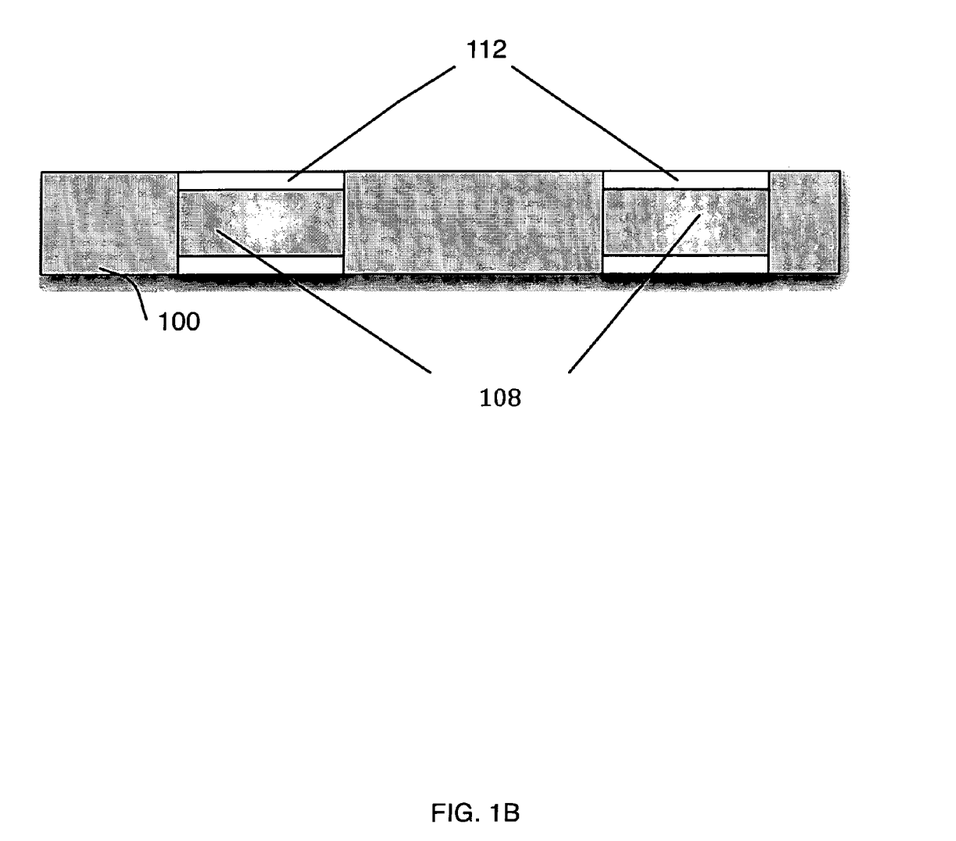
FIG. 1B is a cross-sectional view of a memory array illustratively depicting two fluorescence material elements in conjunction with one embodiment of an aspect of the invention.
Figure 1C:
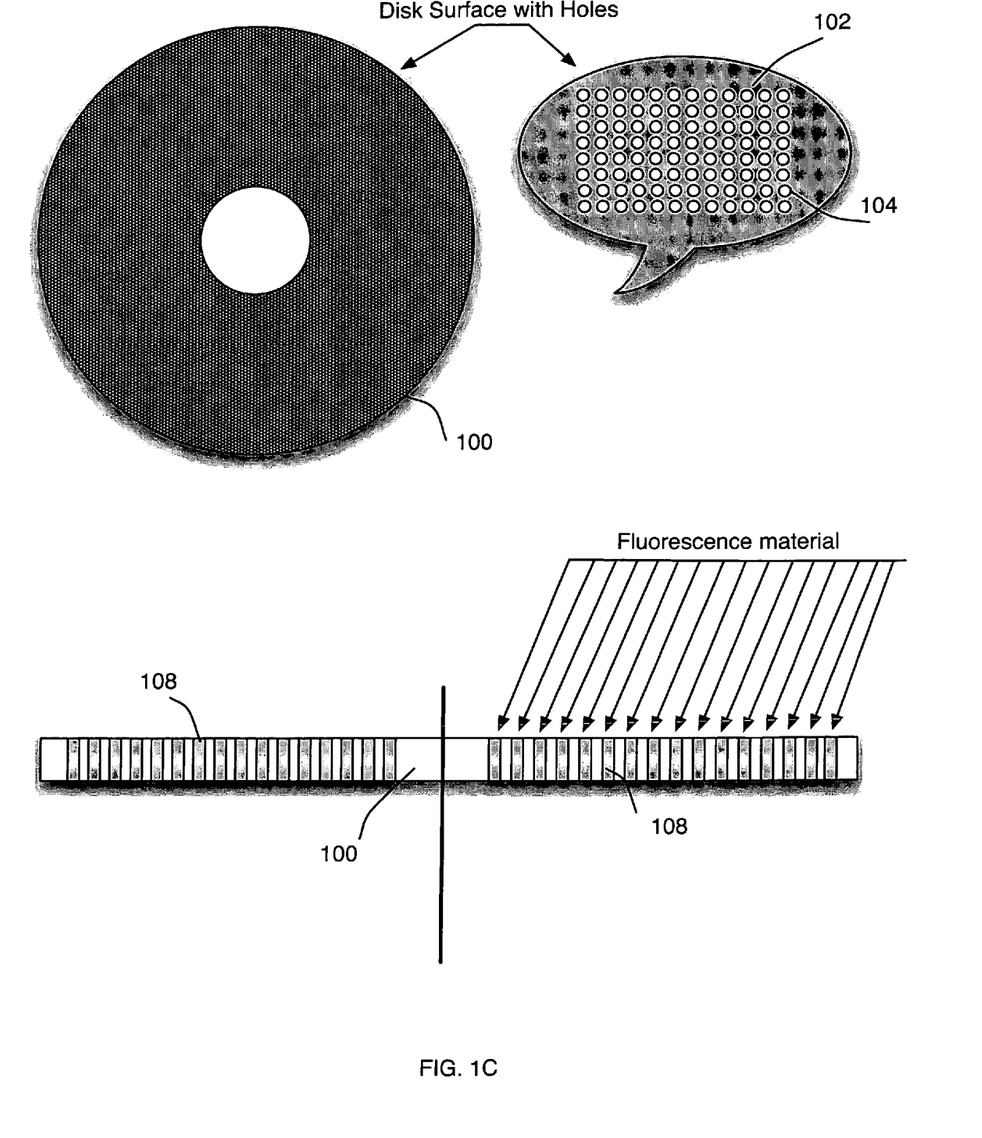
FIG. 1C is a view of a memory array illustratively depicting multiple fluorescence material elements illustratively depicting a representative embodiment of certain aspects of the invention.

The storage array disk 100 may have memory elements 106 deposited thereon in the form of dots 110 or it may have the memory elements 106 deposited within openings 112. As is illustrated in FIGS. 1A through 1C and more specifically in FIG. 1B, the phosphorescent material 108 may be deposited within each opening 112 so that one side of the a phosphorescent material 108 is accessible to radiation on each side of the storage array disk 100. Alternatively, if the phosphorescent material is deposited in the form of dots 110 on one surface of the storage array disk 100, the phosphorescent material 108 may be accessible to radiation only on the face or side of the storage array disk 100 on which the phosphorescent material 108 has been deposited.

In one embodiment, a light encoder/decoder 114 is associated with the memory element 106. The light encoder/decoder 114 is capable of either emitting light or receiving light from the associated memory element 106. Alternatively, a separate light encoder 116 and light decoder 118 may be employed to activate and receive information, respectively, from the associated memory element 106.

Figure 2:
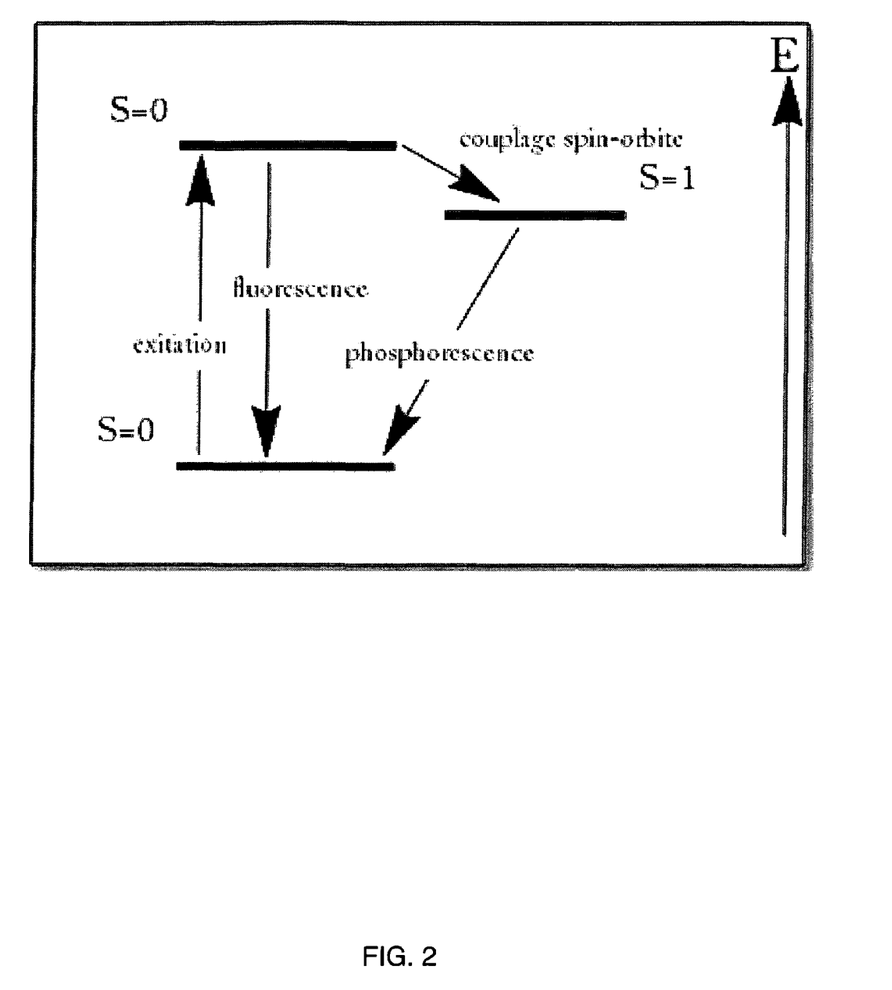
FIG. 2 is a graphic representation of an activation and decay sequence for fluorescent material depicting a representative embodiment of certain aspects of the invention.

Referring to FIG. 2, phosphorescence is a process in which energy absorbed by a substance is released relatively slowly in the form of light. This mechanism is used to charge by exposure to light. The phosphorescent materials used for these materials absorb the energy and "store" it for a longer time as the processes required to re-emit the light occur less often. A substance absorbs photons (electromagnetic radiation) and then re-radiates photons. Quantum mechanically, this can be described as an excitation to a higher energy state and then a return to a lower energy state accompanied by the emission of a photon. This is a form of luminescence (light emission) and is distinguished by photo-excitation.

Most photo-luminescent events, in which a chemical substrate absorbs and then re-emits a photon of light, are fast, on the order of 10 nanoseconds. Light is absorbed and emitted at these fast time scales in cases where the energy of the photons involved matches the available energy states and allowed transitions of the substrate. In the special case of phosphorescence, the absorbed photon energy undergoes an unusual intersystem crossing into an energy state of higher spin multiplicity, usually a triplet state.

The simplest photo-luminescent processes are resonant radiations, in which a photon of a particular wavelength is absorbed and an equivalent photon is immediately emitted. This process involves no significant internal energy transitions of the chemical substrate between absorption and emission and is extremely fast. Chemical substrate may undergoes internal energy transitions before re-emitting the energy from the absorption event. The most familiar such effect is fluorescence, which is also typically a fast process, but in which some of the original energy is dissipated so that the emitted light photons are of lower energy than those absorbed. The generated photon in this case is said to be red shifted, referring to the loss of energy.

Figure 3:
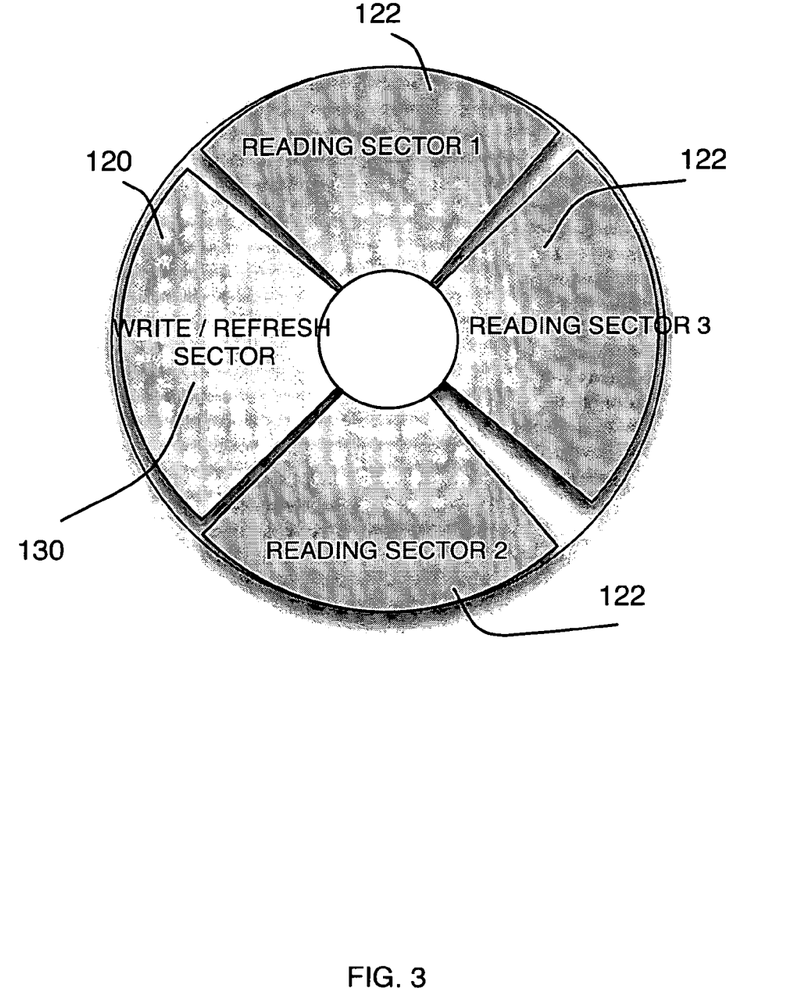
FIG. 3 is a simplified top view of a memory array illustratively depicting a representative embodiment of certain aspects of the invention.
Figure 3A:
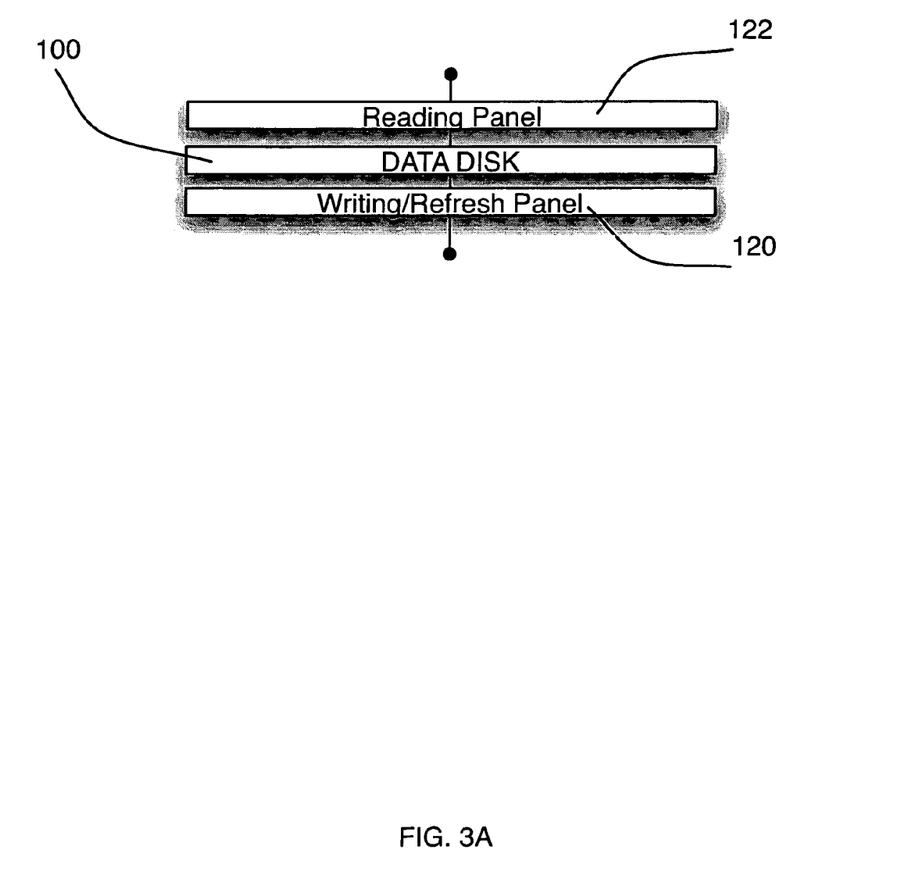
FIG. 3A is cross-sectional view of a memory array illustratively depicting certain functional aspects of a representative embodiment of an aspect of the invention.
Figure 4:
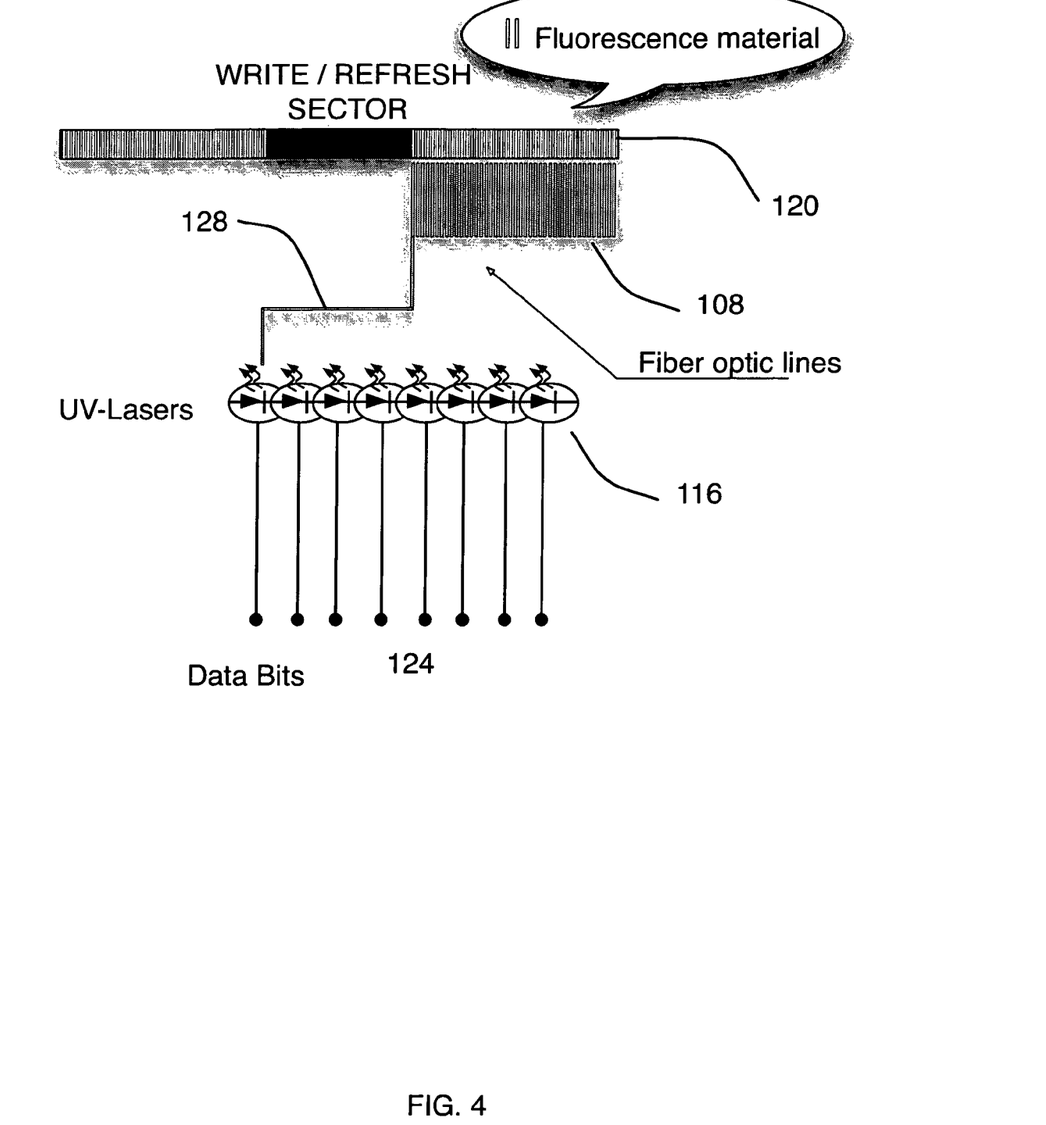
FIG. 4 is a cross-sectional view of a memory array illustratively depicting certain functional activation and refreshing aspects of a representative embodiment of an illustrative aspect of the invention.
Figure 5:
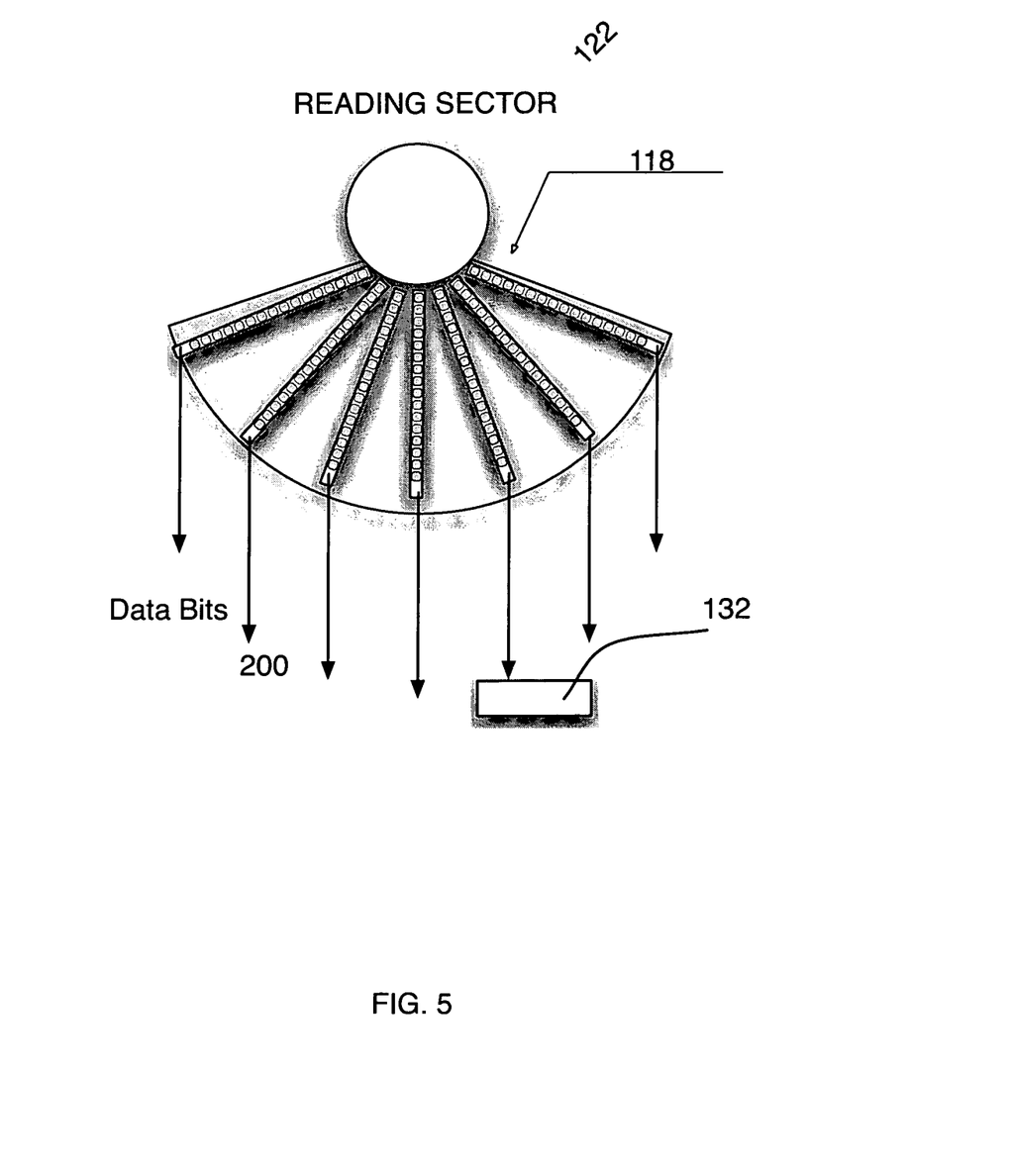
FIG. 5 is a high level, simplified view of multiple memory arrays illustratively depicting certain reading aspects of a representative embodiment of the invention.

FIGS. 3 and 3A illustrate a further embodiment of the invention which includes a writing/refresh panel 120 and a reading panel 122. The writing/refresh panel 120 includes a plurality of light encoders 116 which are activated by a plurality of write bit drivers 124 each of which is configured to drive or activate one or more of the light encoders 116 to which it corresponds. By way of example only, in operation data may be written to each of the memory elements 106 by means of a photon beam such as a UV laser 126 which is focused on one or more of the memory elements 106.

The photons may be delivered via optical waveguides or focused beams (not shown) and may be delivered to phosphorescent material layer 108 which is disposed on either side of the memory array 100 or in a hole in the memory array 100. A material which may be used is $(SrAl_2O_4):Eu,Dy,Y$. It keeps light for a long time (minutes) and has a majority of emission in the visible spectrum. The material may also be chosen based on its glowing wavelength. Materials with 600-900 nm of emitting wavelength can be used in the system. The photo sensors should be selected accordingly. Some examples:

$YOBr:Eu3$
$LiInO2:Sm3+$
$LaAsO4:Eu3+$

It is also appreciated that vanadium dioxide can be used not only as flop-flop (as discussed hereinafter) but as a material which stores information. This approach requires two lasers—one laser changes the vanadium dioxide state from transparent to mirror; the other laser reads the information. Thus, the light encoder 116 is driven to provide the radiation into the phosphorescent material layer 108. That radiation is absorbed and results in a concomitant emission by the phosphorescent material layer 108 when it reradiates the energy in the form of photons.

Thus, if the light encoder 116 is not driven to provide the radiation into the phosphorescent material layer 108, the bit will register as a "0" and if it is driven to provide radiation into the phosphorescent material layer 108, the bit will register as a "1". The radiation state of the phosphorescent material in the material layer 108 will store the bit value for a period of time. As is illustratively shown in FIG. 3 a refresh panel 130 may be operatively associated into the right/refresh panel 120. In an illustrative embodiment a phosphorus material is selected which has a thickness which permits it to be encoded and start to discharge photons within a single rotation of the memory array 100. The refresh panel 130 may be operatively engaged and driven to refresh the data which has been written to the phosphorescent material layer 108 and a reenergize it on each revolution. Alternatively, data may be refreshed on every other turn of the disc or such other times as is advantageously determined based upon the material and the data decay.

The reading panel 122 accesses the data written on the memory array 100 and the values represented by each of the memory bits. The reading panel 122 is comprised of a plurality of bit decoders 118 which are operatively driven by a plurality of the decoder drivers 132. Each bit decoder 118 receives photons corresponding to the memory bits associated with a memory element 106. Thus in order to determine or read the bit value from a particular memory element 106, the decoder 118 detects the light, if any, that is being reradiated by the phosphorescent material layer 108 and provides an indication of that detected light. If no light is detected then it is representative of a "0" bit state. If light is detected then it is representative of a "1" bit state or information stored in the cell. This could also be reversed depending on the configuration and information state.

The bit decoders 118 include a plurality of data distribution lines 200 which distribute the light from the photon emissions from each of the bit sites. Various types of data distribution lines may be employed such as fiber optic lines, optical waveguides, focused beam lines and other forms of physical structures that guide electromagnetic waves in the optical spectrum. Optical waveguides are most easily understood as variants of the simple dielectric slab waveguide, also called planar waveguide. A strip waveguide is basically a strip of the guiding layer confined between cladding layers. Optical fiber is typically a circular cross-section dielectric waveguide consisting of a dielectric material surrounded by another dielectric material with a lower refractive index.

As can be appreciated, the optical system permit different processors to simultaneously access data from each of the bit sites without being limited by a lockout or bus. The bit decoders 118 read the data that the bit sites generate and transfer it along the distribution lines 200 to output ports 140. Based upon the size of the storage array 100, large numbers of processors and peripheral systems can simultaneously access and write to the storage array. By way of example, for a standard disk with a diameter of 95 mm and internal hone (in center) with 24 mm diameter and reader dimensions 1 mm wide 75 processors can be connected to this distributed storage array 100. In cases where the reader has a smaller width, the quantity of processors will be more accordingly. Modern photo sensors have a size of 0.03 mm which provides a potential of 2511 readers and the same quantity of processors. By changing the disk size it is possible to adjust the system to substantially any quantity of processors.

It can be appreciated that an inherent problem with a memory cell which must discharge itself of radiation is the potential inability to convert a particular cell from a "1" bit state to a "0" bit state zero within the re-write time demanded by the system. Thus, it would be desirable to have the ability to "turn off" a radiating phosphorescent material layer 108 in a period which is shorter than overall re-radiation time.

Figure 6:
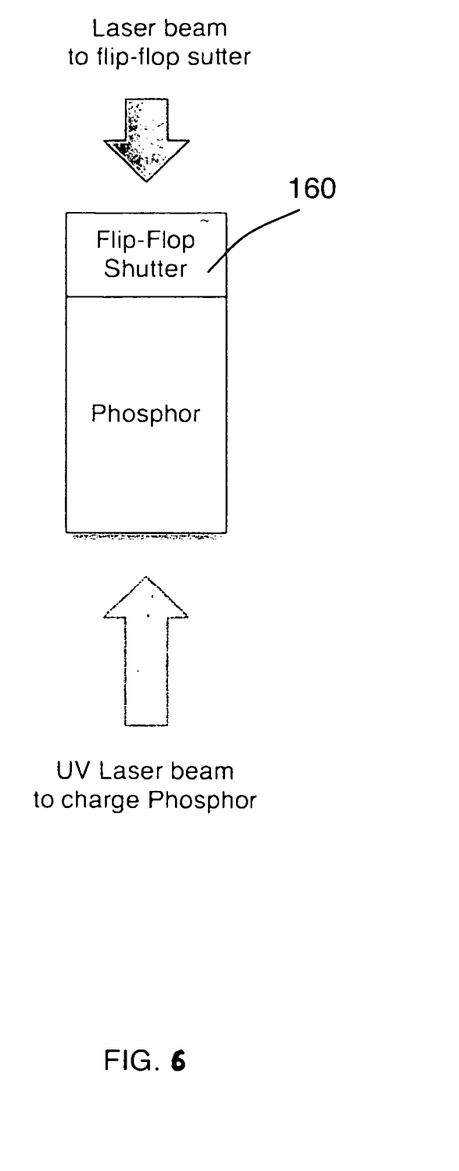
FIG. 6 is a cross-sectional view of a memory array illustratively depicting certain functional activation and deactivation aspects of a representative embodiment of an illustrative aspect of the invention.

Referring to FIG. 6, it can be appreciated from a further embodiment and illustrated aspect of the invention, that a flip-flop shutter 160 may be operatively disposed to alter the transmittance a bit state. Any one of the number of materials may be used which prevents the radiation from being detected by the photon decoders 118. Thus, by way of example, vanadium dioxide may be operatively disposed on one face of the phosphorescent material layer 108. In the event that the bit has to be rewritten from a "1" bit state to a "0" bit state, the vanadium dioxide is written to with a laser thus causing it to go into a conductive state and become nontransparent. That will result in the bit decoder 118 sensing a reflected or non-radiative state of the phosphorescent material 108 associated with the bit and reading it as a "0" bit state. Thus the phosphor material may still be reradiating but it is not being detected because of the activation of the vanadium dioxide.

Figure 7:
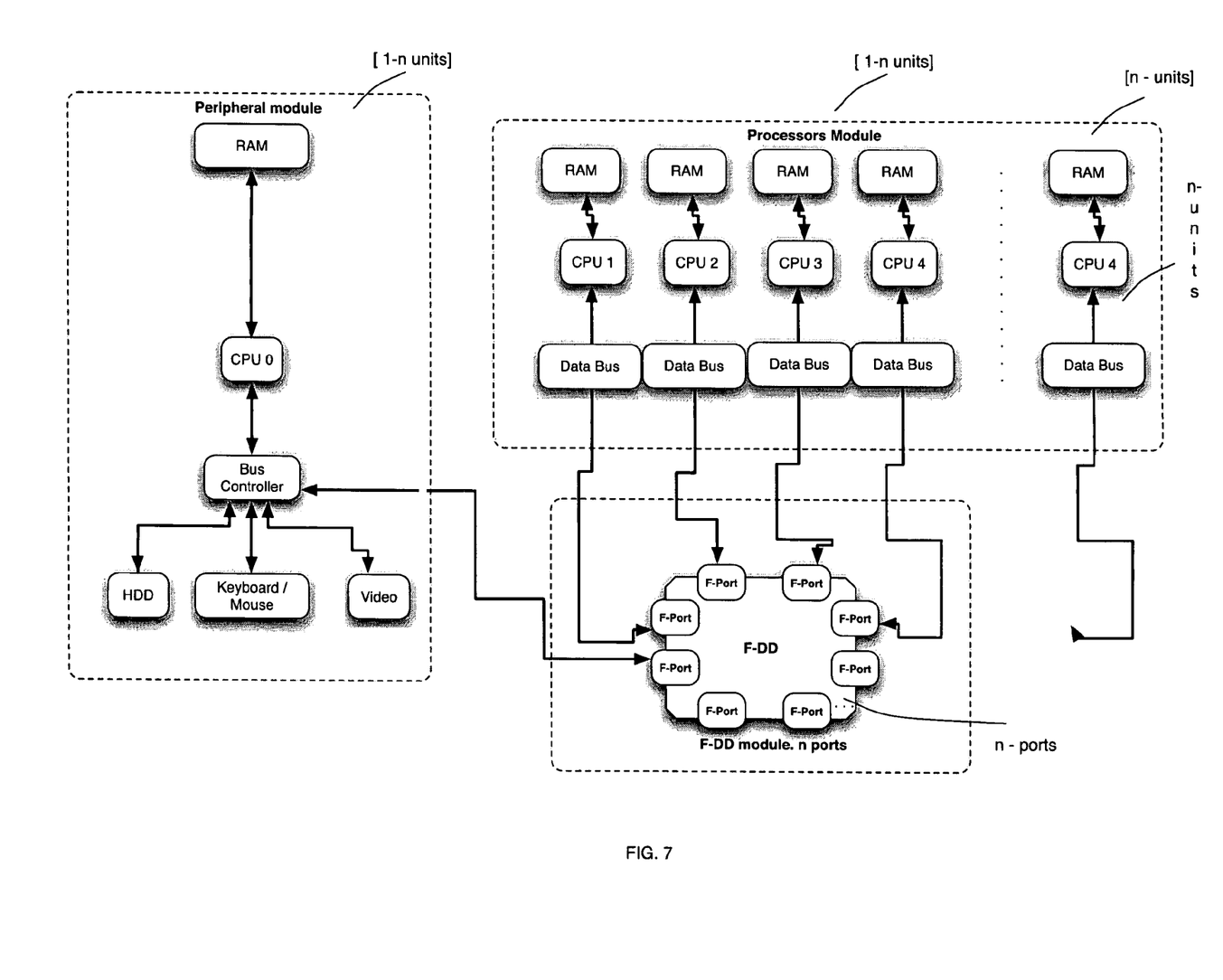
FIG. 7 is an illustrative block diagram of a memory array depicting certain aspects of a representative embodiment of the invention.

The processors may be operatively attached to a plurality of data ports as is illustratively shown in FIG. 7. Each output data port 140 has immediate and simultaneous access to the data on the storage array disk 100. Data is transported to one or more central processing units which employ it in conjunction with each unit's activities. Similarly a peripheral module may be operatively disposed to provide data in and out of the memory storage array 100.

Although it has been reference that photons are employed and the term light is used in a descriptive fashion herein, it can be appreciated at this refers to all forms electromagnetic radiation whether in the visible, infrared or ultraviolet spectrum, combinations thereof and single frequencies within those spectrums. Similarly the size of the phosphorescent material may be varied and although the description has focused on the writing and reading of a single bit to each cell, multiple bits may be written depending on the material and the ability of the phosphor material to absorb radiation and reradiate it in discreet areas and states.

The above description and drawings are used merely to illustrate certain preferred embodiments which achieve the overall objects, features, and advantages of the present invention. Although those skilled in the art will recognize and appreciate that substitutions, additions, deletions, modifications and/or other changes may be made without departing from the spirit or scope of the invention, it is understood and expressly stated that the invention is not limited by the foregoing description but is only limited by the scope of the appended claims and that the certain advantages and preferred embodiments which have been described above are not limitations but merely examples of the breath of the invention.

What I claim is:

1. A non-holographic photon memory system for simultaneously permitting access to stored data comprising:
 a. an optical storage array having a plurality of optical memory elements each optical memory element being physically separated from each other optical memory element;

b. each memory element having a phosphorescent material layer;
c. a light encoder/decoder operatively associated with the phosphorescent material layer;
d. means to cause a light encoder/decoder to generate a radiation beam which is sensed and absorbed by a phosphorescent material layer;
e. sensor means associated with the light encoder/decoder to detect the absence or presence of re-radiated light from each phosphorescent material layer;
f. a plurality of external systems each capable of simultaneously accessing individual memory elements within the plurality of optical memory elements; and,
g. data transmission means for simultaneously distributing and providing access to the sensed presence or absence of re-radiated light to each of the external systems.

2. A photon memory system according to claim 1 wherein the light encoder/decoder includes a separate encoder means and decoder means.

3. A photon memory system according to claim 1 further comprising a write bit driver associated with the means to cause a light encoder/decoder to generate a radiation beam.

4. A photon memory system according to claim 1 further comprising a read bit driver associated with the means to detect the absence or presence of re-radiated light from each phosphorescent material layer.

5. A photon memory system according to claim 1 wherein the phosphorescent material layer is a single molecule of phosphorescent material.

6. A photon memory system according to claim 1 wherein the phosphorescent material layer is comprised of a plurality of regions, each of which is capable of separately absorbing and re-radiating light.

7. A photon memory system according to claim 1 wherein the data transmission means for simultaneously distributing and providing access to the sensed presence or absence of re-radiated light to each of the external systems is an optical waveguide.

8. A photon memory system according to claim 1 wherein data transmission means for simultaneously distributing and providing access to the sensed presence or absence of re-radiated light to each of the external systems is a fiber optics waveguide.

9. A photon memory system according to claim 1 wherein the phosphorescent material layer is selected from the group consisting of material that can be charged by light and can store light.

10. A photon memory system according to claim 1 wherein the phosphorescent material layer is selected from the group consisting of luminofirums or phosphors.

11. A photon memory system according to claim 1 wherein the phosphorescent material layer is selected from the group consisting of materials which emit re-radiated light of a wavelength between 530-900 nm.

12. A photon memory system according to claim 1 wherein the phosphorescent material layer is selected from the group consisting of $(SrAl2O4):Eu,Dy,Y.$, YOBr:Eu3

$LiInO2:Sm3+$, $LaAsO4:Eu3+$ or vanadium dioxide.

13. A photon memory system according to claim 1 wherein the optical storage array is a disk having a first and a second side and the encoder means and decoder means are configured to apply light and receive light from the first side of the optical storage array.

14. A photon memory system according to claim 1 wherein the optical storage array is a disk having a first and a second side and the encoder means and decoder means are configured such that the encoder applies light to the first side of the optical storage array and the decoder receives light from the second side of the optical storage array.

15. A photon memory system according to claim 1 wherein the phosphorescent material layer has associated therewith an optical flip-flop switch layer which may be selectively activated to prevent detection of light emitted by an activated the phosphorescent material layer.

16. A photon memory system according to claim 15 wherein the optical flip-flop switch layer is selected from a group consisting of materials which become reflective upon activation by light.

17. A photon memory system according to claim 15 wherein the optical flip-flop switch layer is vanadium dioxide.

* * * * *